United States Patent [19]
Hall

[11] Patent Number: 5,951,073
[45] Date of Patent: Sep. 14, 1999

[54] EXTENDABLE VEHICLE BUMPER

[75] Inventor: Robert L. Hall, Lancaster, S.C.

[73] Assignee: Cleophus White, Heath Springs, S.C.

[21] Appl. No.: 09/105,444

[22] Filed: Jun. 26, 1998

[51] Int. Cl.$^6$ .................................................. B60R 19/40
[52] U.S. Cl. ............................................................. 293/119
[58] Field of Search .............................................. 293/119

[56] References Cited

U.S. PATENT DOCUMENTS

| | | | |
|---|---|---|---|
| 3,677,595 | 7/1972 | Hamilton | 296/119 |
| 3,751,092 | 8/1973 | Granig | 296/119 |
| 3,934,912 | 1/1976 | Ogihara et al. | 296/119 |
| 3,947,061 | 3/1976 | Ellis | 296/119 |
| 5,101,927 | 4/1992 | Murtuza | 296/119 |
| 5,370,429 | 12/1994 | Reuber et al. | 296/119 |

Primary Examiner—Gary C. Hoge

[57] ABSTRACT

A new extendable vehicle bumper for warning a driver of a vehicle that their vehicle is coming close to contact with an object such as a wall or another vehicle. The inventive device includes an elongate contact bumper with a plurality of telescopic fluidic piston-cylinder actuators coupled to one side of the contact bumper. Each of the telescopic fluidic piston-cylinder actuators has a mounting portion for attachment to the bumper area of a vehicle. A remote controller is electrically connected to the telescopic fluidic piston-cylinder actuator. The remote controller has an actuator and a warning indicator. The actuator of the remote controller permits selective extending and retracting of the telescopic fluidic piston-cylinder actuators. The warning indicator warns a user when the telescopic fluidic piston-cylinder actuators are pushed from the extended position towards the retracted position by the contact bumper.

6 Claims, 2 Drawing Sheets

EXTENDABLE VEHICLE BUMPER

BACKGROUND OF THE INVENTION

1. Field of the Invention

The present invention relates to vehicular bumpers and more particularly pertains to a new extendable vehicle bumper for warning a driver of a vehicle that their vehicle is coming close to contact with an object such as a wall or another vehicle.

2. Description of the Prior Art

The use of vehicular bumpers is known in the prior art. More specifically, vehicular bumpers heretofore devised and utilized are known to consist basically of familiar, expected and obvious structural configurations, notwithstanding the myriad of designs encompassed by the crowded prior art which have been developed for the fulfillment of countless objectives and requirements.

Known prior art vehicular bumpers include U. S. Pat. Nos. 3,677,595; 3,608,943; 3,947,061; 3,751,092; 3,588,160; and 1,284,199.

While these devices fulfill their respective, particular objectives and requirements, the aforementioned patents do not disclose a new extendable vehicle bumper. The inventive device includes an elongate contact bumper with a plurality of telescopic fluidic piston-cylinder actuators coupled to one side of the contact bumper. Each of the telescopic fluidic piston-cylinder actuators has a mounting portion for attachment to the bumper area of a vehicle. A remote controller is electrically connected to the telescopic fluidic piston-cylinder actuator. The remote controller has an actuator and a warning indicator. The actuator of the remote controller permits selective extending and retracting of the telescopic fluidic piston-cylinder actuators. The warning indicator warns a user when the telescopic fluidic piston-cylinder actuators are pushed from the extended position towards the retracted position by the contact bumper.

In these respects, the extendable vehicle bumper according to the present invention substantially departs from the conventional concepts and designs of the prior art, and in so doing provides an apparatus primarily developed for the purpose of warning a driver of a vehicle that their vehicle is coming close to contact with an object such as a wall or another vehicle.

SUMMARY OF THE INVENTION

In view of the foregoing disadvantages inherent in the known types of vehicular bumpers now present in the prior art, the present invention provides a new extendable vehicle bumper construction wherein the same can be utilized for warning a driver of a vehicle that their vehicle is coming close to contact with an object such as a wall or another vehicle.

The general purpose of the present invention, which will be described subsequently in greater detail, is to provide a new extendable vehicle bumper apparatus and method which has many of the advantages of the vehicular bumpers mentioned heretofore and many novel features that result in a new extendable vehicle bumper which is not anticipated, rendered obvious, suggested, or even implied by any of the prior art vehicular bumpers, either alone or in any combination thereof.

To attain this, the present invention generally comprises an elongate contact bumper with a plurality of telescopic fluidic piston-cylinder actuators coupled to one side of the contact bumper. Each of the telescopic fluidic piston-cylinder actuators has a mounting portion for attachment to the bumper area of a vehicle. A remote controller is electrically connected to the telescopic fluidic piston-cylinder actuator. The remote controller has an actuator and a warning indicator. The actuator of the remote controller permits selective extending and retracting of the telescopic fluidic piston-cylinder actuators. The warning indicator warns a user when the telescopic fluidic piston-cylinder actuators are pushed from the extended position towards the retracted position by the contact bumper.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new extendable vehicle bumper apparatus and method which has many of the advantages of the vehicular bumpers mentioned heretofore and many novel features that result in a new extendable vehicle bumper which is not anticipated, rendered obvious, suggested, or even implied by any of the prior art vehicular bumpers, either alone or in any combination thereof.

It is another object of the present invention to provide a new extendable vehicle bumper which may be easily and efficiently manufactured and marketed.

It is a further object of the present invention to provide a new extendable vehicle bumper which is of a durable and reliable construction.

An even further object of the present invention is to provide a new extendable vehicle bumper which is susceptible of a low cost of manufacture with regard to both materials and labor, and which accordingly is then susceptible of low prices of sale to the consuming public, thereby making such extendable vehicle bumper economically available to the buying public.

Still yet another object of the present invention is to provide a new extendable vehicle bumper which provides in the apparatuses and methods of the prior art some of the advantages thereof, while simultaneously overcoming some of the disadvantages normally associated therewith.

Still another object of the present invention is to provide a new extendable vehicle bumper for warning a driver of a vehicle that their vehicle is coming close to contact with an object such as a wall or another vehicle.

Yet another object of the present invention is to provide a new extendable vehicle bumper which includes an elongate contact bumper with a plurality of telescopic fluidic piston-cylinder actuators coupled to one side of the contact bumper. Each of the telescopic fluidic piston-cylinder actuators has a mounting portion for attachment to the bumper area of a vehicle. A remote controller is electrically connected to the telescopic fluidic piston-cylinder actuator. The remote controller has an actuator and a warning indicator. The actuator of the remote controller permits selective extending and retracting of the telescopic fluidic piston-cylinder actuators. The warning indicator warns a user when the telescopic fluidic piston-cylinder actuators are pushed from the extended position towards the retracted position by the contact bumper.

Still yet another object of the present invention is to provide a new extendable vehicle bumper that helps a driver of a vehicle avoid damage to their vehicle from collisions to other objects.

Even still another object of the present invention is to provide a new extendable vehicle bumper that is helpful to a driver trying to parallel park because it will warn a driver when the end of their vehicle with the device is too close another vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
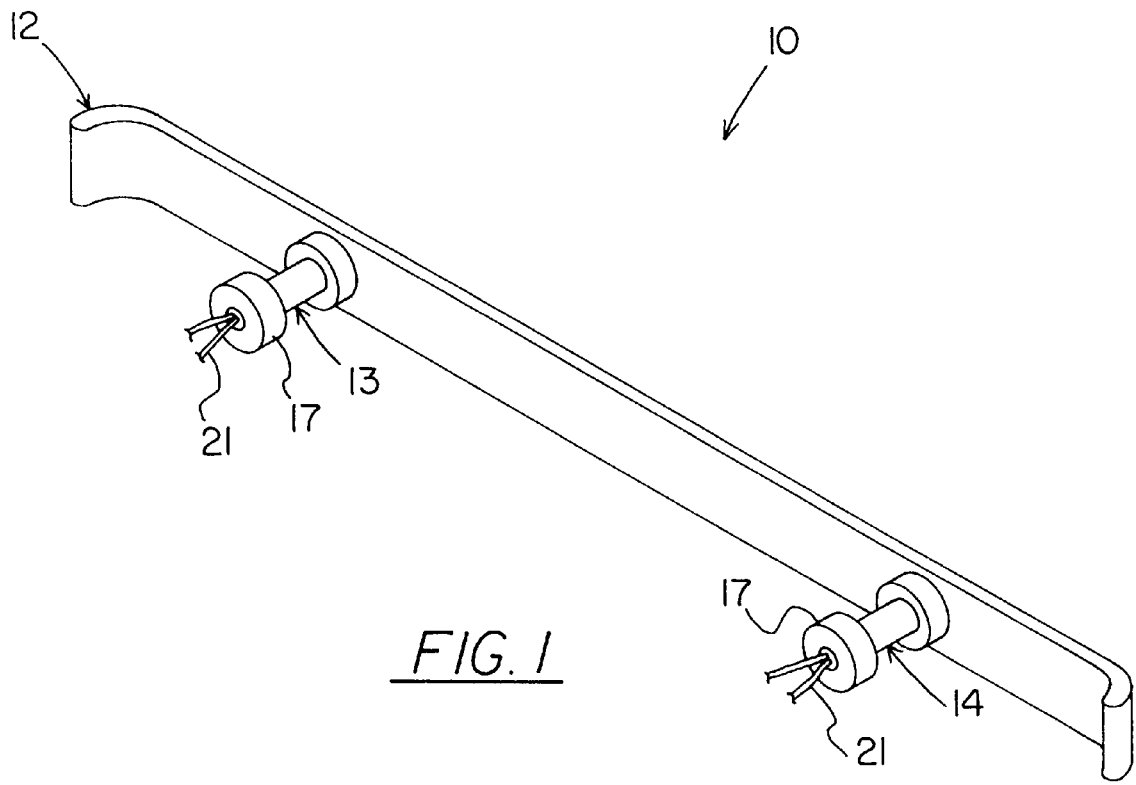
FIG. 1 is a schematic perspective view of the contact bumper of a new extendable vehicle bumper according to the present invention.
Figure 2:
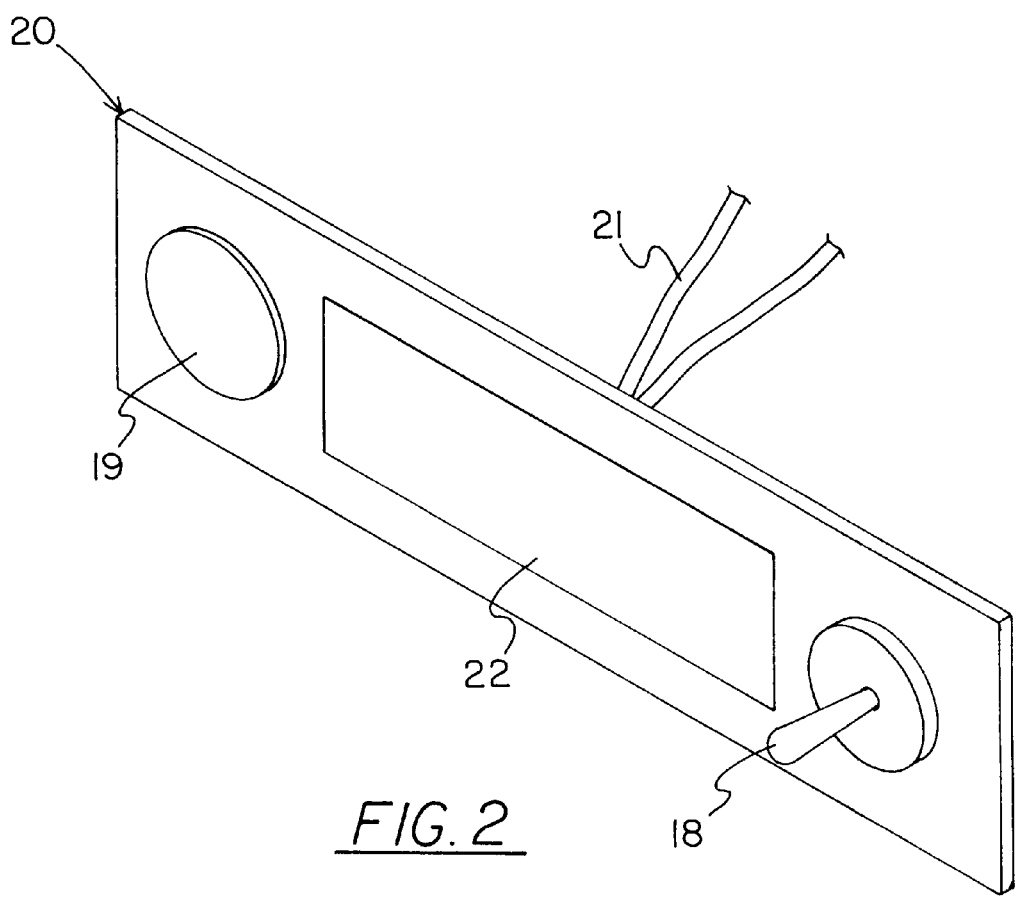
FIG. 2 is a schematic perspective view of the face plate of the remote controller of the present invention.
Figure 3:
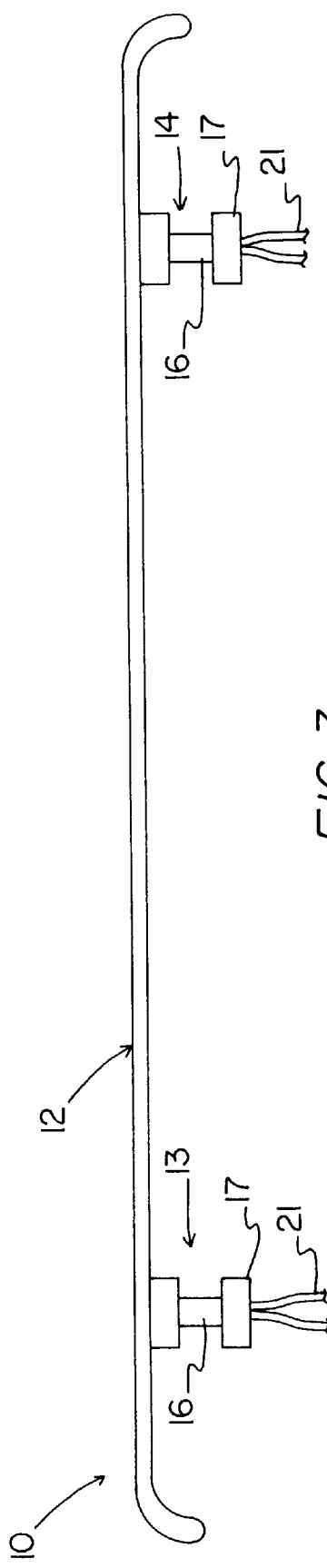
FIG. 3 is a schematic side view of the contact bumper of the present invention the with telescopic fluidic piston-cylinder actuators in the retracted position.

With reference now to the drawings, and in particular to FIGS. 1 through 4 thereof, a new extendable vehicle bumper embodying the principles and concepts of the present invention and generally designated by the reference numeral 10 will be described.

As best illustrated in FIGS. 1 through 4, the extendable vehicle bumper 10 generally comprises an elongate contact bumper 12 with a plurality of telescopic fluidic piston-cylinder actuators 13,14 coupled to one side of the contact bumper 12. Each of the telescopic fluidic piston-cylinder actuators 13,14 has a mounting portion 17 for attachment to the bumper area of a vehicle. A remote controller is electrically connected to the telescopic fluidic piston-cylinder actuator 18. The remote controller has an actuator 18 and a warning indicator 19. The actuator 18 of the remote controller permits selective extending and retracting of the telescopic fluidic piston-cylinder actuators 13,14. The warning indicator 19 warns a user when the telescopic fluidic piston-cylinder actuators 13,14 are pushed from the extended position towards the retracted position by the contact bumper 12.

In use, the contact warning device is for mounting to the bumper area of a vehicle for warning a driver when the bumper area of the vehicle is in close proximity with another object. The device may be mounted as a stand alone bumper or so that it forms an integral part of the bumper of the vehicle that can be extended from the main bumper. In closer detail, the elongate contact bumper 12 has a first and second sides and a pair of opposite ends.

Figure 4:
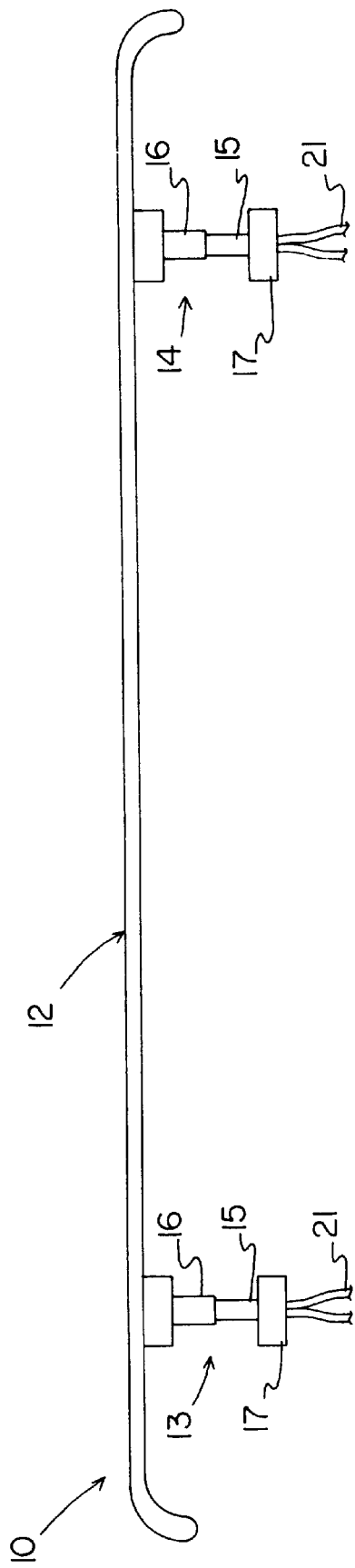
FIG. 4 is a schematic side view of the contact bumper of the present invention with the telescopic fluidic piston-cylinder actuators in the extended position.

A plurality of telescopic fluidic piston-cylinder actuators 13,14 are coupled to the inner side of the contact bumper 12. Each the telescopic fluidic piston-cylinder actuator 17 has a piston portion 15 and a cylinder portion 16. Each of the telescopic fluidic piston-cylinder actuators 13,14 also has a mounting portion 17 for attachment to the bumper area of a vehicle. The piston portion 15 is retractably extendable from the cylinder portion 16 between a retracted position (FIG. 3) and an extended position (FIG. 4). The telescopic fluidic piston-cylinder actuators 13,14 extend the contact bumper 12 a predetermined distance from the bumper area of a vehicle when the telescopic fluidic piston-cylinder actuators 13,14 are extended to the extended position. Preferably, the telescopic fluidic piston-cylinder actuators 13,14 are extendable at least 2 inches and ideally between 2 and 6 inches from the retracted position.

A remote controller is electrically connected (preferably by wires 21) to the telescopic fluidic piston-cylinder actuator 17. The remote controller has an actuator 18 and a warning indicator 19. The actuator 18 and the warning indicator 19 of the remote controller are electrically connected to the telescopic fluidic piston-cylinder actuators 13,14. The remote controller preferably has a generally rectangular face plate 20 on which the actuator 18 and the warning indicator 19 of the remote controller are provided. The face plate 20 of the remote controller is adapted for mounting in the passenger compartment of a vehicle. Ideally, the face plate 20 includes a label area 22 for displaying labels and indicia to indicate the extension bumper to a user. The actuator 18 of the remote controller permits selective extending and retracting of the telescopic fluidic piston-cylinder actuators 13,14 is the retracted and extended positions. The warning indicator 19 is designed for warning a user when the telescopic fluidic piston-cylinder actuators 13,14 are pushed from the extended position towards the retracted position by the contact bumper 12 when the outer side of the contact bumper 12 comes into contact with an obstacle when the vehicle is moving towards the obstacle. Preferably, the warning indicator 19 comprises a light source that is energized when the telescopic fluidic piston-cylinder actuators 13,14 are pushed from the extended position towards the retracted position.

In use, actuator is actuated so that the telescopic fluidic piston-cylinder actuators are extended from the retracted position to the extended position so that the contact bumper is extended a distance away from the vehicle. When the vehicle is moved so that the contact bumper is in contact with an obstacle, the obstacle pushes the contact bumper so that the telescopic fluidic piston-cylinder actuators are push back towards their retracted position. This action activates the warning indicator to let the driver of the vehicle know that they are in danger of hitting the obstacle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A contact warning device for mounting to the bumper area of a vehicle, said device comprising:

an elongate contact bumper having a first and second sides and a pair of opposite ends;

a plurality of telescopic fluidic piston-cylinder actuators being coupled to said second side of said contact bumper, each said telescopic fluidic piston-cylinder actuator having a piston portion and a cylinder portion, the piston portion being retractably extendable from the cylinder portion between a retracted position and an extended position;

each of said telescopic fluidic piston-cylinder actuators having a mounting portion for attachment to the bumper area of a vehicle;

a remote controller being electrically connected to said telescopic fluidic piston-cylinder actuator, said remote controller having an actuator and a warning indicator, said actuator and said warning indicator of said remote controller being electrically connected to said telescopic fluidic piston-cylinder actuators;

said actuator of said remote controller permitting selective extending and retracting of said telescopic fluidic piston-cylinder actuators between said retracted and extended positions; and said warning indicator being for warning a user when said telescopic fluidic piston-cylinder actuators are pushed from said extended position towards said retracted position by said contact bumper; and wherein said remote controller has a face plate, said actuator and said warning indicator of said remote controller being provided on said face plate of said remote controller, said face plate of said remote controller being adapted for mounting in the passenger compartment of a vehicle.

2. The device of claim 1, wherein said telescopic fluidic piston-cylinder actuators extend said contact bumper a predetermined distance from the bumper area of a vehicle when said telescopic fluidic piston-cylinder actuators are extended to said extended position.

3. The device of claim 2, wherein said telescopic fluidic piston-cylinder actuators are extendable at least 2 inches from said retracted position when in said extended position.

4. The device of claim 1, wherein said warning indicator comprises a light source, said light source being energized when said telescopic fluidic piston-cylinder actuators are pushed from said extended position towards said retracted position.

5. A contact warning device for mounting to the bumper area of a vehicle, said device comprising:

an elongate contact bumper having a first and second sides and a pair of opposite ends;

a plurality of telescopic fluidic piston-cylinder actuators being coupled to said second side of said contact bumper, each said telescopic fluidic piston-cylinder actuator having a piston portion and a cylinder portion, the piston portion being retractably extendable from the cylinder portion between a retracted position and an extended position;

each of said telescopic fluidic piston-cylinder actuators having a mounting portion for attachment to the bumper area of a vehicle;

said telescopic fluidic piston-cylinder actuators extending said contact bumper a predetermined distance from the bumper area of a vehicle when said telescopic fluidic piston-cylinder actuators are extended to said extended position;

wherein said telescopic fluidic piston-cylinder actuators are extendable at least 2 inches from said retracted position when in said extended position;

a remote controller being electrically connected to said telescopic fluidic piston-cylinder actuator, said remote controller having an actuator and a warning indicator, said actuator and said warning indicator of said remote controller being electrically connected to said telescopic fluidic piston-cylinder actuators;

said remote controller having a generally rectangular face plate, said actuator and said warning indicator of said remote controller being provided on said face plate of said remote controller, said face plate of said remote controller being adapted for mounting in the passenger compartment of a vehicle;

said actuator of said remote controller permitting selective extending and retracting of said telescopic fluidic piston-cylinder actuators between said retracted and extended positions;

said warning indicator being for warning a user when said telescopic fluidic piston-cylinder actuators are pushed from said extended position towards said retracted position by said contact bumper when said first side of said contact bumper comes into contact with an obstacle when the vehicle is moving towards the obstacle; and wherein said warning indicator comprises a light source, said light source being energized when said telescopic fluidic piston-cylinder actuators are pushed from said extended position towards said retracted position.

6. The contact warning device of claim 1, wherein said face plate has a label area for displaying a label thereon.

* * * * *